US005804673A

United States Patent [19]

Van Nuffel et al.

[11] Patent Number: 5,804,673

[45] Date of Patent: Sep. 8, 1998

[54] BLEND OF BRANCHED AND LINEAR CARBONATE POLYMER RESINS

[75] Inventors: Claude T. E. Van Nuffel, Ostakker, Belgium; Hoang T. Pham, Lake Jackson, Tex.; Sarada Namhata, Terneuzen, Netherlands; Jürgen Eiffler, Stade, Germany

[73] Assignee: The Dow Chemical Compny, Midland, Mich.

[21] Appl. No.: 780,278

[22] Filed: Jan. 9, 1997

[51] Int. Cl.$^{6}$ .................................................. C08L 69/00

[52] U.S. Cl. ...................... 525/469; 525/462; 264/176.1; 264/523

[58] Field of Search .................................. 525/462, 469; 264/176.1, 523

[56] References Cited

U.S. PATENT DOCUMENTS

| | | | |
|---|---|---|---|
| 4,001,184 | 1/1977 | Scott . | |
| 4,652,602 | 3/1987 | Liu | 524/449 |
| 5,171,824 | 12/1992 | Marks et al. | 528/198 |
| 5,198,527 | 3/1993 | Marks et al. | 528/198 |
| 5,362,838 | 11/1994 | McGrath et al. | 528/198 |
| 5,508,359 | 4/1996 | Pham | 525/462 |
| 5,552,224 | 9/1996 | Laughner | 525/469 |

FOREIGN PATENT DOCUMENTS

| | | |
|---|---|---|
| 390 064 | 10/1990 | European Pat. Off. . |
| 498 406 | 8/1992 | European Pat. Off. . |
| 58-138754 | 8/1983 | Japan . |
| 60-215051 | 10/1985 | Japan . |
| 61-16962 | 1/1986 | Japan . |
| 3-281567 | 12/1991 | Japan . |
| 5-295246 | 11/1993 | Japan . |
| WO 95/14743 | 6/1995 | WIPO . |

*Primary Examiner*—David Buttner

[57] ABSTRACT

Improved branched carbonate polymer blend compositions are prepared comprising a branched carbonate polymer component and a different linear carbonate polymer component. The branched carbonate polymers according to the invention are especially suitable for use in extrusion, blow molding, thermoforming and foaming processes and provide improved parts or articles.

9 Claims, No Drawings

BLEND OF BRANCHED AND LINEAR CARBONATE POLYMER RESINS

This invention relates to branched carbonate polymer blend compositions comprising an amount of a linear carbonate polymer component. The invention also involves an improved process for preparing extruded, blow molded, thermoformed and foamed parts from these improved branched carbonate polymer resins and the improved structures and parts. The process is based on the use of certain branched carbonate polymer blend compositions comprising an amount of a specific linear carbonate polymer component. These resin blend compositions provide improved processes for preparing, among other things, extruded sheet structures and blow molded, thermoformed and foamed parts due to their excellent combinations of processability and physical properties of the parts. Improved extruded, blow molded, thermoformed and foamed parts are obtained having a good balance of physical properties including particularly melt strength, cracking resistance, processability, plate-out behavior, surface properties, and ignition resistance.

As compared to linear carbonate polymers having otherwise similar melt flow rates (melt viscosity at low shear conditions) branched carbonate polymers are known to be more shear sensitive, exhibiting significantly decreased viscosity at higher shear processing conditions. Branched resins, however, have been found to have somewhat lower impact resistance values than a corresponding linear resin of the same melt flow rate. In attempts to increase the impact resistance values by increasing the molecular weight of the polymer, the processability of the carbonate polymer resins decreases. Therefore the output rates of the production equipment producing the various articles or structures are considerably reduced by attempts to improve the product properties or vice versa.

It is also commonly known to the person skilled in the art that higher throughput rates can be obtained by lowering the melt viscosity of the polymeric material to be processed. This lowering of melt viscosity is generally obtained through lowering of the molecular weight or glass transition temperature. This, however, is known to have a negative effect on the toughness properties of the polymer. This effect, in addition to the fact that branched carbonate polymer has a lower impact resistance compared to a like molecular weight linear carbonate polymer, has the result that a branched carbonate polymer of low molecular weight may not possess the functional properties required for the application such as extrusion, blow molding, thermoforming, foaming, etc.

There have been various efforts to improve the combinations of properties of carbonate polymer resins by blending resin components.

For example, for relatively low molecular weight, easy flow resins suited for use in preparing injection molded thin wall parts, it is shown in U.S. Pat. No. 5,508,359 (1996) that higher molecular weight branched resins can be incorporated in varying amounts into blends with a low molecular weight linear carbonate polymer to improve the cracking resistance of the low molecular weight resin. For very low molecular weight injection molding resins suited for use in preparing optical recording media, it is shown in Japanese Patent Publications 60-215,051 (1985) and 61-016,962 (1986) that relatively low molecular weight branched resins can be incorporated in varying amounts into blends with a higher melt flow rate, low molecular weight linear carbonate polymer to improve processability and product properties of the low molecular weight resin.

JP-05-295,246 (1992), teaches linear/branched polycarbonate blend compositions of 25 to 60 weight percent branched polycarbonate resin and 40 to 75 weight percent linear polycarbonate resin to provide improved blow molding, extrusion molding and vacuum molding. JP-03-281,567 (1990) teaches linear/branched polycarbonate blend compositions of 70–95wt % branched polycarbonate resin and 30–5wt % of linear polycarbonate resin to provide improved hot moldability such as for vacuum molding. Unfortunately, there is no teaching as to the desired molecular weights or melt flow rates of these resins that is appropriate for obtaining optimized and improved property combinations.

It is therefore a goal of the present invention to provide an improved branched carbonate polymer resin, an improved process for the preparation of extruded, blow molded, thermoformed and foamed parts and improved extruded, blow molded, thermoformed and foamed parts themselves. It would be desired to have branched carbonate polymers having an improved balance of properties such as processability, impact resistance, crack resistance and melt strength.

This invention therefore involves a branched carbonate polymer blend composition comprising a first branched carbonate polymer component (preferably from about 60 to about 95 parts by weight) having a molecular weight of from about 32,000 to about 45,000 and a second, linear carbonate polymer component (preferably from about 5 to about 40 parts by weight) having a molecular weight of from about 15,000 to about 27,000, the blend having a molecular weight between about 29,000 and about 39,000 and a Melt Flow Rate (MFR) as measured according to ASTM D-1238, conditions of 300° C. and 1.2 kilograms mass between about 2 and about 8 grams per 10 minutes (gr/10 min).

In a preferred aspect the carbonate polymer blend compositions according to the invention have a viscosity ratio greater than the viscosity ratio of the branched carbonate polymer that has a similar processability (viscosity at high shear rates) alone, preferably greater than 4.5, preferably greater than 4.7, more preferably greater than 4.9.

In another embodiment, the present invention is a process for preparing a branched carbonate polymer composition comprising the step of combining a first branched carbonate polymer component having a molecular weight of from about 32,000 to about 45,000 and a second, linear carbonate polymer component having a molecular weight of from about 15,000 to about 27,000.

In another aspect the present invention is a process for preparing an extruded sheet or profile comprising the steps of melting a branched carbonate polymer composition as described above, forcing the melted polymer through a die to form a sheet or profile, optionally calibrating the sheet or profile and cooling. In an alternative embodiment, the present invention is a processes for preparing blow molded articles comprising the steps of melting a branched carbonate polymer composition as described above, extrusion of an expandable parison, expansion or blowing of the parison to the desired shape and cooling.

The invention also involves blends of these carbonate polymer compositions with other types of polymers such as ABS, impact modifiers and the like.

As will be described in more detail below, the branched resin, the processes for preparing parts or structures and the parts according to the present invention provide surprisingly improved combinations of processability and physical properties in the part.

The higher molecular weight branched carbonate polymers suitable for use in the first component in the compositions according to the present invention can be prepared by techniques known in the literature. Unless otherwise indicated, the references to "molecular weight" herein refer to weight average molecular weights ("Mw") determined on the carbonate polymers using gel permeation chromatography with a bisphenol A polycarbonate standard. Otherwise, viscometry or light scattering can also be used to determine weight average molecular weight if similar results are obtained. It should be noted that various references refer to "viscosity average" molecular weight, which is not the same as "weight average" molecular weight but can be correlated or converted to Mw values.

In general, these carbonate polymers are prepared from one or more multihydric components by reacting the multihydric compound, such as a diphenol, with a carbonate precursor such as phosgene, a haloformate or a carbonate ester such as diphenyl or dimethyl carbonate. Aromatic carbonate polymers are preferred and aromatic diphenols are preferred for use as at least part of the multihydric compound with preferred diphenols including but not limited to 2,2-bis (4-hydroxyphenyl)-propane (that is, bisphenol A), phenol, 4,4'-(9-H-fluorene-9-ylidene)bis (that is, bishydroxyphenylfluorene), 4,4'-thiodiphenol (TDP), 1,1-bis (4-hydroxyphenyl)-1-phenyl ethane (bisphenol AP); phenolphthalein; bis (4-hydroxyphenyl) diphenyl methane; tetrabromobisphenol A (TBBA); and tetrachlorobisphenol A (TCBA). These carbonate polymers also include aromatic carbonate polymers prepared from two or more different dihydric phenols or a combination of a dihydric phenol and a glycol or a hydroxy- or acid-terminated polyester or a dicarboxylic acid in the event a carbonate copolymer or heteropolymer is desired.

The higher molecular weight branched carbonate polymer components can be prepared from such materials by any of several known processes such as the known interfacial, solution or melt processes. Suitable types and amounts of chain terminators (typically monophenolic compounds) and/or branching agents (typically phenols having three or more hydroxy or condensation reactive groups) can be employed to obtain the desired molecular weight and branching degrees in the higher molecular weight branched component. Suitable branching agents are generally one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl)heptene-2; 4,6-dimethyl-2,4,6-tri(4-hydroxyphenyl)pentene-2; 4,6-dimethyl-2,4,6-tri(4-hydroxyphenyl)pentane; 1,3,5-tri(4-hydroxyphenyl)benzene; 1,3,5-tri(2-hydroxyphenyl)benzol; 1,1,1-tri(4-hydroxyphenyl)ethane; 2,6-bis(2-hydroxy-5-methylbenzyl)-4-methylphenol; tetra(4-hydroxyphenyl)methane; trisphenol; bis(2,4-dihydroxyphenyl)ketone; 1,4-bis(4,4-dihydroxytriphenylmethyl)benzene; α,α',α"-tri(4-hydroxyphenyl)-1,3,5-tri-isopropylbenzene; 3,3-bis(4-hydroxyaryl)oxyindole;, isatinbisphenol; 5-chloroisatin; 5,7-dichloroisatin; 5-bromoisatin; trimellitic acid; pyromellitic acid; benzophenonetetracarboxylic acid; and including for the appropriate compounds, the acid chlorides or other condensation reactive derivatives thereof such as trimellitic trichloride, trimesoylchloride and trimellitic anhydride chloride. Specifically preferred branching agents include phloroglucin; phloroglucid; 1,1,1-tri(4-hydroxyphenyl)ethane; trimellitic acid; trimellitic trichloride; pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

Suitable higher molecular weight, branched carbonate polymer components can also be prepared by preparing a precursor component, preferably a precursor carbonate polymer component, which has a latently reactive moiety. If the precursor is a polymer, the latently reactive moiety can be directly incorporated into the precursor polymer using a suitable monomer or attached to the polymer in a later functionalization step. Preferably the precursor component latently reactive moieties, especially if in a terminal location on a polymeric precursor, form products having an average functionality greater than two, meaning that they are able to form at least one branch from a polymer backbone. Such latently reactive moieties preferably can be rapidly activated, preferably thermally, and preferably without the use of additional reactive compounds at a desired time and produce a desired higher molecular weight, branched carbonate polymer component without producing undesired, low molecular weight by-products or undesirably large domains of highly crosslinked polymer gels. Most preferably, such moiety can be incorporated into the carbonate polymer in an interfacial carbonate polymer polymerization process.

As used herein, the term "interfacial carbonate polymer polymerization process" refers to a process where the multihydric reactants, including any multi- or mono-reactive compounds used to incorporate the latently reactive moiety, are dissolved in a water phase by forming an alkali metal adduct, then reacted with the carbonate polymer precursor forming a polymer which is dissolved in a separate organic phase. For example, dihydric phenols are dissolved as alkali metal phenates for reaction with the carbonate precursor forming an aromatic carbonate polymer which is dissolved in a separate organic phase. As those skilled in this area know, nitrogen-containing moieties, such as the unsaturated imido compounds of U.S. Pat. Nos. 3,652,715 and 3,770,697, cannot generally be present or incorporated in such a process and are therefore not suitable for use in aspect of the present invention.

One technique to provide a latent, thermally reactive moiety is to utilize arylcyclobutene terminated carbonate polymers such as are shown in U.S. Pat. Nos. 5,198,527 and 5,171,824. It has been found that the arylcyclobutene terminated carbonate polymers are readily processable at standard carbonate polymer processing conditions, can be very readily combined with and thoroughly dispersed in a second carbonate polymer component across a range of molecular weights in the second component. As shown, the arylcyclobutene moieties can then be heat activated to combine via the arylcyclobutene moieties to produce the high molecular weight, branched polymer component. These are especially preferred high molecular weight carbonate polymer components since the arylcyclobutene reaction does not require any free radical initiator or other activating compounds to initiate the addition reaction at reasonable temperatures and conditions for processing Bisphenol A-based polycarbonate.

In general, by whatever production technique it is prepared, the branched carbonate polymer component should have a weight average molecular weight of at least about 29,000, preferably at least about 30,000 and more preferably at least about 31,000. In order to obtain polymer blends with minimized levels of gels and other beneficial effects of the high molecular weight branched component, it has been found that the weight average molecular weight of the high molecular weight branched component should not be higher than about 45,000, preferably not higher than 39,000, preferably not higher than about 38,000, more preferably not higher than about 37,000, most preferably not higher than about 36,000. In this range it has been found that the branched carbonate polymer should have a melt flow rate of at least about 1.2 grams per 10 minutes, preferably at least about 2 grams per 10 minutes (g/10 min), preferably at least about 2.5 g/10 min, more preferably at least about 3.0 g/10 min and most preferably at least about 3.5 g/10 min and preferably no more than about 8.5 g/10 min, preferably no more than about 8 g/10 min, more preferably no more than about 7.5 g/10 min, most preferably no more than about 7 g/10 min.

In general, the presence and degree of branching can be determined in the branched carbonate polymer component by measuring the concentration of reacted branching agent in the branched carbonate polymer. The concentration of reacted branching agent in the high molecular weight branched carbonate polymer component can typically be determined by IR or NMR spectroscopy or by liquid chromatography, depending upon the nature of the branching agent. It has been found that levels of branching agent in the branched carbonate polymer components for use in the present invention should be in the range of from about 0.005 to about 1 mole branching agent per mole of dihydroxy compound, preferably from about 0.01 to about 0.8, and more preferably from about 0.1 to about 0.6.

In general, it has been found that the branched component is sufficiently branched if it has a higher degree of "shear thinning" than a linear resin of the same molecular weight and will then provide a higher degree of "shear thinning" in the final blend composition at an appropriate level of incorporation.

This improvement in the shear thinning in the blend composition means that if the viscosities of the blend composition and the linear carbonate polymer component alone are independently measured at increasing levels of shear, the measured viscosity of the claimed blend composition is observed to be reduced to a greater degree or at a greater rate than observed for the linear carbonate polymer component without the branched component. It has been found that branched components with higher degrees of branching will provide shear sensitivity improvements at lower levels while lower degrees of branching will conversely require use of the component in larger amounts to provide shear sensitivity improvements. These measurements of shear sensitivity can be done by standard techniques with oscillatory shear rheometry using a Dynamic Mechanical Spectrometer (DMS) or by steady state capillary rheometry using a capillary rheometer.

In particular, a fairly standard measurement technique for shear sensitivity of carbonate polymers involves measuring the apparent viscosity at different apparent shear rates in a capillary rheometer in a shear rate range of 15 to 500 inverse seconds (s−1) and/or measuring the complex viscosity at different frequencies in a frequency range of 0.1 to 100 radians per second (rad.s−1) by DMS (Dynamic Mechanical Spectroscopy) at a temperature of 280° C.

As initially published by W. P. Cox and E. H. Merz in the Journal of Polymer Science Vol. XXVIII, Issue nr 118 (1958), pp. 619–622, there is a correlation and general equivalence between DMS and capillary rheometry to evaluate the shear sensitivity and melt strength/viscosity properties of a polymer.

To quantify shear sensitivity for practical use over a wide range of shear rates, the complex viscosity at 0.1 rad.s−1 (equivalent to s−1) from the DMS analysis can be divided by the apparent viscosity at 450 $s^{-1}$ from the capillary data. Using this viscosity ratio number, it can be seen that the shear sensitivity properties of the compositions of the present invention are improved compared to those of branched polycarbonates of the same processability (viscosity value at high shear rate) or the same melt strength (viscosity value at low shear rate). An increase of 10% in this viscosity ratio number compared to the comparative resin, is found to be significant with respect to improving the property balance of the resin, particularly melt strength.

In general, it has been found suitable to employ the branched component in the carbonate polymers in amounts (based on linear plus branched carbonate polymer) of at least about 60 weight percent, desirably at least about 65 weight percent, preferably at least about 70 weight percent and more preferably at least about 75 weight percent, said weight percentages being based upon total amount of the two carbonate polymer components. In order to maintain processability and thermoplasticity, the high molecular weight, branched component is employed in amounts less than or equal to about 95 weight percent, preferably less than or equal to about 94 weight percent, and more preferably less than or equal to about 93 weight percent. As mentioned above, the level of branching in the branched component affects the level of branched component necessary to provide the desired degree of shear sensitivity in the claimed carbonate polymer compositions. The amounts of branched component can, therefore, be optimized for particular levels of branching in the branched component.

The suitable linear carbonate polymers are known in the literature and commercially available. For purposes of obtaining desired melt strength during extrusion and blow molding and crack resistance in the final molded parts, it has been found that the linear carbonate polymer component should have a weight average molecular weight of at least about 15,000, preferably at least about 16,000, more preferably at least about 17,000, and most preferably at least about 18,000. In order to keep the desired level of polymer melt flow and processability it has been found that the linear carbonate polymer component should have a weight average molecular weight of no more than about 27,000, preferably no more than about 26,500, more preferably no more than about 26,000, most preferably no more than about 25,500. In this range it has been found that the linear carbonate polymer should have a melt flow rate of at least about 13 g/10 min, preferably at least about 14 g/10 min, more preferably at least about 15 g/10 min and more preferably at least about 16 g/10 min and most preferably no more than about 100 g/10 min, preferably no more than about 95 g/10 min, more preferably no more than about 90 g/10 min most preferably no more than about 85 g/10 min.

In general, the linear carbonate polymer makes up the balance of the carbonate polymer blend, based on 100 weight percent of the linear and branched carbonate polymer. It has been found suitable to employ the linear component in the carbonate polymers in amounts of at least about 5 percent, preferably at least about 6 weight percent and more preferably at least about 7 weight percent, said weight percentages being based upon total amount of the two carbonate polymer components. In order to maintain processability and thermoplasticity, the linear component is employed in amounts less than or equal to about 40 weight percent, preferably less than or equal to about 35 weight percent, and more preferably less than or equal to about 30 weight percent.

As known, these linear carbonate polymers are prepared from the dihydric components and by processes as listed above for the higher molecular weight branched carbonate polymers without the use of branching agent. As is also well known, suitable chain terminators (typically monophenolic compounds) can be employed to obtain the desired molecular weight in the lower molecular weight component. The linear component in the blends of the present invention is produced separately from and does not include the unbranched (i.e., linear) polymer produced at the same time and contained in the higher molecular weight branched carbonate polymer component. Although it is theoretically possible to produce the two components in different conditions and/or different sequential or parallel reactors in a single or integrated production process, the linear and branched components need to be produced separately in order to obtain the molecular weight and structure characteristics of each component that produce the desired properties in the claimed blends.

It is understood that the individual linear or branched components suitable for use in preparing the blends according to the present invention may be a single component carbonate polymer directly obtained from a polymerization process or may alternatively be a combination of two components of the same type (either linear or branched) of differing molecular weights and melt flow rates that are blended to obtain the desired intermediate melt flow rate product. This type of system is practiced commercially to provide a broader range of polycarbonate resins of differing melt flow rates while reducing the overall number of different products that the production facility must supply.

The suitable branched and linear carbonate polymer components in the present invention also include carbonate polymers prepared from two or more different multihydroxy compounds, preferably dihydroxy compounds, and preferably phenols, or a combination of a multihydroxy compound, such as a diphenol, and a glycol or a hydroxy- or acid-terminated polyester or a dicarboxylic acid in the event a carbonate copolymer or heteropolymer is desired. It is also possible to employ multifunctional carboxylic acids, especially aromatic carboxylic acids, and prepare poly(ester-carbonate) resins such as the known aromatic poly (estercarbonates). The known silicon-containing carbonate monomers can also be used to prepare silicon-containing carbonate polymers that are suitable for use in the blends according to the present invention.

One of the key features of the branched carbonate polymer resin blend compositions according to the present invention and suitable for use in the processes and articles according to the present invention is that the blend compositions have a weight average molecular weight within the desired range. For purposes of obtaining desired melt strength during extrusion and blow molding and crack resistance in the final molded parts, it has been found that the blends should have a weight average molecular weight of at least about 29,000, more preferably at least about 30,000 and most preferably at least about 31,000. In order to keep the desired level of polymer melt flow and processability it has been found that the blends should have a weight average molecular weight of no more than about 39,000, preferably no more than about 38,000, more preferably no more than about 37,000 most preferably no more than about 36,000. In this range it has been found that the resin blend compositions should have a melt flow rate of at least about 2 g/10 min, preferably at least about 2.5 g/10 min, more preferably at least about 3.0 g/10 min and most preferably at least about 3.5 g/10 min and preferably no more than about 8.5 g/10 min, preferably no more than about 8 g/10 min, more preferably no more than about 7.5 g/10 min most preferably no more than about 7 g/10 min.

The blend compositions according to the present invention can be prepared by (a) the blending of two separately prepared components, (b) the addition of a previously prepared component into the reaction process that is preparing or has prepared the other component, (c) the appropriate operation of a sequence or series of reactors to prepare the linear or branched carbonate polymer component in the presence of the previously prepared other carbonate polymer component prior to the recovery of the carbonate polymer from the reaction mixture or (d) the appropriate operation of parallel reactors to prepare the linear and branched carbonate polymer components followed by combining the unrecovered reaction products prior to the recovery of the carbonate polymer blend from the reaction mixture.

It has been found that the process for preparing extruded, blow molded, thermoformed or foamed parts or structures and the resulting parts or structures according to the present invention are surprisingly improved by use of the described carbonate polymer blend compositions. Extrusion, blow molding, thermoforming and foaming processes are well known in the art and commercially practiced for production of a broad range of parts and structures.

As is known, extrusion processes for preparing sheet, profiles and like structures involve the steps of melting, forcing the melted polymer through a die, calibration, if needed, and cooling.

As is known, blow molding processes for preparing bottles, containers, instrument panels and like structures involve the steps of extrusion of an expandable parison, expansion or blowing of the parison to the desired shape and cooling.

As is known, thermoforming processes for preparing trays, containers, chocolate molds, and like structures involve the steps of preparing a thermoformable sheet or preform, heating the sheet or preform adjacent to the mold or form of the desired shape, applying a pressure (air pressure or a physical force) or suction to appropriately shape the sheet or preform in the mold or form and cooling.

As is known, foaming processes for preparing electronic parts, business equipment and like structures involve the steps of applying sufficient heat or other energy to activate a blowing agent that is incorporated in the heat softened carbonate polymer, followed by expansion of the foam cells and optional shaping.

The improvements in resins, processes and articles and structures according to the present invention are due to the lower viscosity of the material at the higher shear rate processing conditions, including during the foam cell expansion step, combined with the higher melt strength (melt modulus) properties (at low shear) that provide improved productivity and/or better properties than other resins that would process similarly.

In addition to the linear carbonate polymer carbonate component, the branched carbonate polymer compositions according to the present invention can advantageously contain the standard types and amounts of the additive-type components frequently incorporated into carbonate polymers. These components can include ignition resistance additives, fillers (that is, glass fibers, talc, clay, etc.), pigments, dyes, antioxidants, heat stabilizers, ultraviolet light absorbers, mold release agents, impact modifiers, antistatic additives, and the other additives commonly employed in carbonate polymer compositions. The resins according to the invention are also advantageously used in blend compositions with other polymer resins such as monovinylidene aromatic polymer optionally containing an impact modifier component (e.g., ABS or AES).

The following Experiments are given to further illustrate the invention and should not be construed as limiting its scope. In the following Experiments, all parts and percentages are by weight unless otherwise indicated.

EXPERIMENTS

Several experiments were performed showing the benefits of resins according to the present invention in terms of shear sensitivity ("shear thinning") and melt strength. The materials used in these experiments are shown in Table I. These are known, commercially available polycarbonate resins. The molecular weights of the components were determined by gel permeation chromatography (GPC) with an ultraviolet detector. The melt flow rate (MFR) values are measured according to ASTM D-1238, conditions of 300° C. and 1.2 kilograms mass and are reported in grams per 10 minutes (g/10 min).

TABLE I

Polycarbonates

| No. | Type | Mw | MFR |
|---|---|---|---|
| a | Linear-10 | 29000 | 10 |
| c | Linear-30 | 22000 | 30 |
| d | Linear-80 | 18000 | 80 |
| e | Branched-2.8 | 38000 | 2.8 |
| f | Branched-5.3 | 33000 | 5.3 |

The blend compositions are shown in Table II below and were prepared by blending the indicated polycarbonate components in pellet form using a Werner and Pfleiderer 25 mm twin-screw extruder using the barrel temperatures indicated in Table II and pelletizing. These pellets were then dried at 120° C. for at least 4 hours. In the final products, the components were observed to have blended homogeneously and remained completely miscible. The blend compositions according to the invention are thermally stable (maintain molecular weight and color) at a temperature 100° C. above the Tg of the carbonate polymer blend composition, which was 250° to 310° C. in this case.

The viscosity at a relatively high apparent shear rate of 450 s−1 at a temperature of 280° C. is measured by a Capillary Rheometer (Rheograph 2003 from the Gottfert Co.) using the steady state shear technique and is representative of processing conditions in the extruder. The viscosity values are given in Pascal-seconds (Pa-s).

The viscosity of the material at relatively low shear conditions is determined by DMS analysis. In this technique, the complex viscosity at a frequency of 0.1 rad.s−1 (equivalent to a shear rate of 0.1 s−1) at a temperature of 280° C. (low shear conditions) is measured by a Dynamic Mechanical Spectrometer Model RMS 800 of the Rheometrics Co., using the oscillatory shear rheometry technique and is representative of state of the material when it leaves the die of the extruder at elevated temperatures. As discussed above, the material viscosity and elastic or storage modulus (G') at low or no shear conditions (0.1 to 25 $s^{-1}$) should be as high as possible to provide the desired stiffness at that condition. On the other hand, at high shear conditions the material viscosity should be as low as possible to provide the desired processability. In other words, the ratio of these two material viscosity values (viscosity ratio) should be as high as possible.

The elastic or storage shear modulus (G') (as mentioned above), the loss shear modulus (G") and tan δ (which is the ratio between loss shear modulus G" and the storage shear modulus G') were also recorded during the same complex viscosity measurement by DMS at a frequency of 25 rad.s−1 (equivalent to a relatively low shear rate of 25 s−1). These modulus measurements (in Pascals or Pa) give further information about the flow and elastic performance (viscoelastic behavior) of the molten resin at the temperature and shear rate/frequency of measurement. As mentioned above, for typical branched resin applications such as sheet extrusion, blow molding or thermoforming, at the low shear rates experienced during the post extrusion steps in these processes, the material needs to have a high viscosity (melt strength) over a temperature range that is as broad as possible. This melt strength is obviously beneficial during the handling and processing that is done to the formed article after extrusion, while still ductile and before it solidifies.

Fabrication of the blends into square plaques for Falling Dart Impact Testing was performed using a Battenfeld injection molding machine. Except as otherwise indicated below, Falling Dart Impact Testing was done generally according to DIN 53443. Injection molded plaques measuring 80 millimeters (mm) by 80 mm by 1 mm were evaluated in the Falling Dart Impact Test which was carried out on a ICI Impact Tester. A driven dart of 5 mm diameter at an impact speed of 2 m/s was used. The support diameter was 40 mm. The energy absorbed by the polycarbonate, expressed in Joules (J), was recorded.

For testing crack resistance of the resins, polycarbonate plaques (80 mm * 80 mm * 3.3 mm) are injection molded on a Demag D150-452 injection molding machine at a melt temperature of 300° C. and a mold temperature of 50° C. Injection speed is kept constant at 63 units (machine units) as is the injection pressure at 127 machine units. Holding pressure profile is kept constant at 120-100-60 bar. All crack resistance test samples were molded under identical conditions.

"Sample strips" 10 mm wide are cut from the center of the polymer plaques parallel to the flow direction and have the final dimensions of 80 mm by 10 mm by 3.3 mm. These sample strips are notched applying a V-shaped notch on one side of the strips. The notch radius is 0.125 mm and the notch depth is 1 mm (±0.1 mm). The notch is sharpened by pushing a new razor blade into the tip of the V-shaped notched, leaving a razor sharp notch about 0.2 mm deep (±0.05 mm) in addition to the existing V-shaped notch of 1.0 mm.

At the location of the notch, the sample is fitted with a sealable rubber sleeve extending a short distance above and below the notch area and containing a mixture of toluene and isooctane (25 vol %/75 vol %), with the sleeve being sealed at each end to contain the solvent. The solvent-containing sleeve maintains the notched area in contact with the solvent while a load or tension can then be applied at the ends. The sample strip is then clamped at the top in a vertical position and a weight or load attached to the bottom that provides the particular amount of applied energy that is desired. As shown in the table below, the time to failure in minutes (min) for the samples at the indicated applied energy is recorded.

The applied energy as indicated in the table is calculated as follows. Based on a sample thickness of 3.3 mm, sample width of 10 mm and a notch depth of 1.0 mm, it is calculated that the load is applied on an area of 29.7 mm2. Then, if the applied weight is, for example, 2900 grams, the applied stress is calculated as:

$$\sigma=[(9.81/1000) * weight]/[area] \text{ in } N/mm2=MPa$$

Knowing that the tensile modulus of polycarbonate is 2400 MPa (all materials in the examples have the same tensile modulus), this calculated stress will cause a strain of $\epsilon=\sigma/2400$. The applied energy, in Joules (J) is then $(\epsilon* \sigma)/2$. This test is performed at different applied energy levels for every resin to show the relationship between Applied Energy and Time to Failure. As shown in the table below, the time to failure for the samples at the indicated applied energy is recorded. From the curves obtained upon plotting this data and the data shown in the Table II below, it can generally be seen that the compositions according to the invention (7 & 8) have good resistance to solvent-induced cracking in addition to their desirable processability properties.

TABLE II

Branched Carbonate Polymer Blends

| Component | Experiment No. 1* | 2* | 3* | 4* | 5* | 6* | 7 | 8 |
|---|---|---|---|---|---|---|---|---|
| Branched 2.8 (wt. %) | 100 | | | | | 57 | 88 | 93 |
| Branched 5.3 (wt. %) | | 100 | | | | | | |
| Linear 10 (wt. %) | | | 100 | | | 43 | | |
| Linear 30 (wt. %) | | | | 100 | | | 12 | |
| Linear 80 (wt. %) | | | | | 100 | | | 7 |
| barrel temps (°C.) | 300 | 300 | 300 | 300 | 300 | 300 | 300 | 300 |
| Blend MFR | 2.8 | 5.3 | 10 | 30 | 80 | 6.6 | 4.6 | 4.1 |
| Blend Mn | 13000 | 12000 | 11500 | 9350 | 8350 | 12400 | 12700 | 12700 |
| Blend Mw | 38000 | 33000 | 29000 | 22000 | 18000 | 34600 | 35900 | 36000 |
| Blend Polydispersity | 2.92 | 2.75 | 2.52 | 2.35 | 2.16 | 2.79 | 2.83 | 2.84 |
| Viscosity 280° C. 450 s-1 (PaS) | 400 | 327 | 558 | 271 | 128 | 340 | 356 | 328 |
| Viscosity 280° C. 0.1 s-1 (PaS) | 2630 | 1550 | 1064 | 387 | 157 | 1450 | 2090 | 2250 |
| Viscosity ratio | 6.58 | 4.74 | 1.91 | 1.43 | 1.23 | 4.26 | 5.87 | 6.86 |
| tan δ at freguency** 25 s-1 | 2.22 | 3.14 | 8.29 | 16.64 | 31.38 | 3.38 | 2.54 | 2.41 |
| G' at freqnency** 25 s-1 (Pa) | 14800 | 8470 | 3140 | 520 | 105 | 7510 | 11800 | 13200 |
| Failing Dart Impact (J) | 3.56 | 3.71 | ND | ND | ND | 4.17 | 3.86 | 3.80 |
| Time to failure (min) at 0.022 J | 1250 | 25 | | | | 27 | 102 | 140 |
| Time to failure (min) at 0.026 J | 218 | 10 | | | | 7 | 56 | 48 |
| Time to failure (min) at 0.030 J | 105 | 5 | | | | 3 | 18 | 16 |
| Time to failure (min) at 0.034 J | 30 | 2 | | | | 2 | 4 | 5 |

* — Control Experiment, not an example according to the present invention.
** — Equivalent to shear rate 25 s-1
ND — no data available As can be seen in the Table above, the viscosity ratio values for the claimed compositions (7 and 8) show that they are more shear sensitive than a branched polycarbonate of similar high shear viscosity value. As can also be seen, the combination of physical properties (impact and cracking resistance) and overall processability (the combination of high and low shear viscosity values and G' value) for the materials of the present invention is better than materials which are either branched resins or other blends of branched and linear resins.

What is claimed is:

1. A branched carbonate polymer blend composition comprising from about 60 to about 95 parts by weight of a first branched carbonate polymer component having a weight average molecular weight of from about 32,000 to about 45,000 and from about 5 to about 40 parts by weight of a second, linear carbonate polymer component having a weight average molecular weight of from about 15,000 to about 27,000, the blend having a weight average molecular weight between about 29,000 and about 39,000 and a Melt Flow Rate (MFR) as measured according to ASTM D-1238 (conditions of 300° C. and 1.2 kilograms mass) between about 2 and about 8 grams per 10 minutes (gr/10 min).

2. A process for preparing an extruded sheet or profile comprising the steps of melting a branched carbonate polymer composition according to claim 1, forcing the melted polymer through a die to form a sheet or profile and cooling.

3. A carbonate polymer blend composition according to claim 1 wherein the blend composition has a viscosity ratio greater than 4.5, which viscosity ratio is equal to a viscosity value determined at a shear rate of 0.1 $s^{-1}$ at a temperature of 280° C. divided by a viscosity value determined at a shear rate of 450 $s^{-}$at a temperature of 280° C.

4. A carbonate polymer blend composition according to claim 3 wherein the blend composition has a viscosity ratio greater than 4.7.

5. A carbonate polymer blend composition according to claim 4 wherein the blend composition has a viscosity ratio greater than 4.9.

6. A carbonate polymer blend composition according to claim 3 wherein the blend composition has a viscosity ratio greater than the viscosity ratio of non-blended branched carbonate polymers having the same viscosity value as the carbonate polymer blend composition at a shear rate of 450 $s^{-1}$ at a temperature of 280° C.

7. A process for preparing a branched carbonate polymer composition comprising the step of combining from about 60 to about 95 parts by weight of a first branched carbonate polymer component having a weight average molecular weight of from about 32,000 to about 45,000 and from about 5 to about 40 parts by weight of a second, linear carbonate polymer component having a weight average molecular weight of from about 15,000 to about 27,000.

8. A process according to claim 7 for preparing a branched carbonate polymer composition where the branched carbonate polymer composition product has a weight average molecular weight between about 29,000 and about 39,000 and a Melt Flow Rate (MFR) as measured according to ASTM D-1238, conditions of 300° C. and 1.2 kilograms mass between about 2 and about 8 grams per 10 minutes (gr/10 min).

9. A process for preparing blow molded articles comprising the steps of melting a branched carbonate polymer composition according to claim 1, extrusion of an expandable parison, expansion or blowing of the parison to the desired shape and cooling.

* * * * *